United States Patent [19]

Taylor

[11] Patent Number: 5,020,568
[45] Date of Patent: * Jun. 4, 1991

[54] UNITIZED DISC FLOW CONTROL ASSEMBLY FOR A RESTRICTOR VALVE

[76] Inventor: Julian S. Taylor, 8300 SW. 8, Oklahoma City, Okla. 73128

[*] Notice: The portion of the term of this patent subsequent to Nov. 6, 2007 has been disclaimed.

[21] Appl. No.: 517,102

[22] Filed: May 1, 1990

Related U.S. Application Data

[63] Continuation-in-part of Ser. No. 303,434, Jan. 30, 1989, Pat. No. 4,922,950, and a continuation-in-part of Ser. No. 474,979, Feb. 5, 1990, Pat. No. 4,967,787.

[51] Int. Cl.$^5$ .............................................. F16K 27/06
[52] U.S. Cl. ................................. 137/316; 137/454.6; 137/625.31; 251/118
[58] Field of Search .................. 137/316, 454.5, 454.6, 137/625.31; 251/312, 118, 124

[56] References Cited

U.S. PATENT DOCUMENTS

| | | | |
|---|---|---|---|
| 2,799,467 | 7/1957 | Hedene | 251/124 |
| 2,891,570 | 6/1959 | Krupp | 251/124 X |
| 3,780,758 | 12/1973 | De Vries | 137/454.6 |
| 4,331,176 | 5/1982 | Parkison | 137/454.5 |
| 4,506,860 | 3/1985 | von Schwerdtner et al. | 251/118 X |
| 4,512,548 | 4/1985 | Keller | 251/118 X |
| 4,678,002 | 7/1987 | Valley | 137/454.5 X |

Primary Examiner—Stephen M. Hepperle
Attorney, Agent, or Firm—Robert K. Rhea

[57] ABSTRACT

In a fluid flow restrictor valve having a flow passageway between its ports opened and closed by superposed multiple orifice discs controlled by a yoke connected with one of the discs and having a yoke stem projecting outwardly of the valve body through a valve body bonnet. A sleeve cage nested by a valve body counterbore intersects the passageway and surrounds the yoke and discs. A second sleeve containing a fluid velocity reducing spider is joined to the downstream end of the sleeve cage. The valve bonnet, yoke, sleeve cage, discs and second sleeve form a unitized assembly easily removed from and reinserted into the valve body for repair or replacement of worn valve components without disconnecting the valve body from a flow line. The unitized assembly components are fail-safe indexed with each other, the valve body and valve control to insure a selected open, closed or partially open flow passageway through the valve.

6 Claims, 2 Drawing Sheets

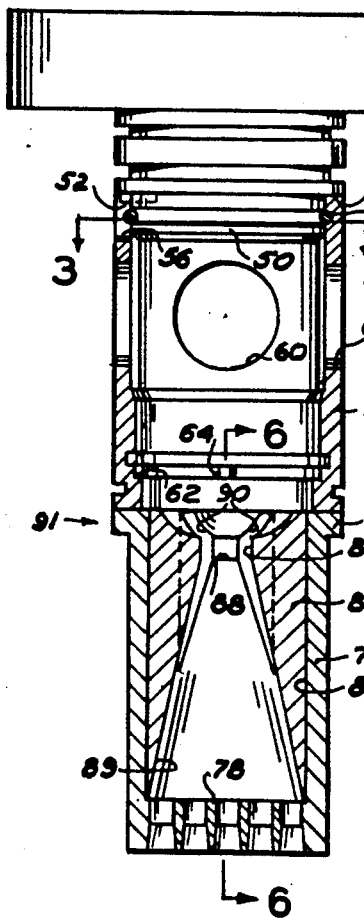
FIG. 2
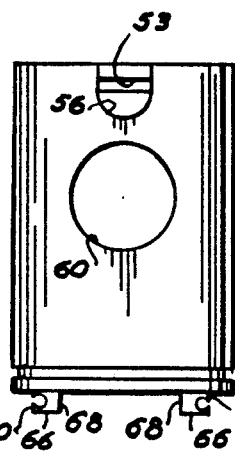
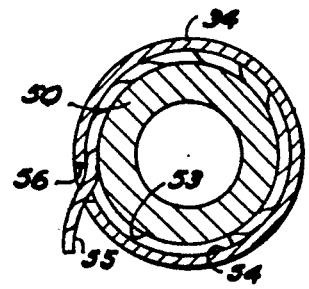
FIG. 3
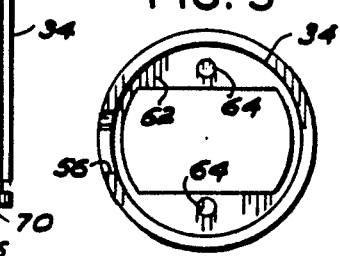
FIG. 4
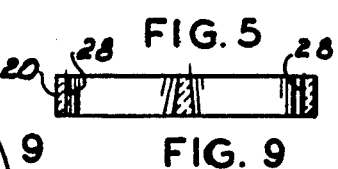
FIG. 5
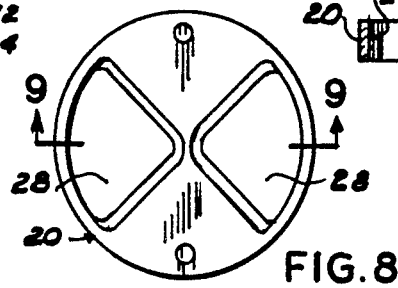
FIG. 8 FIG. 9
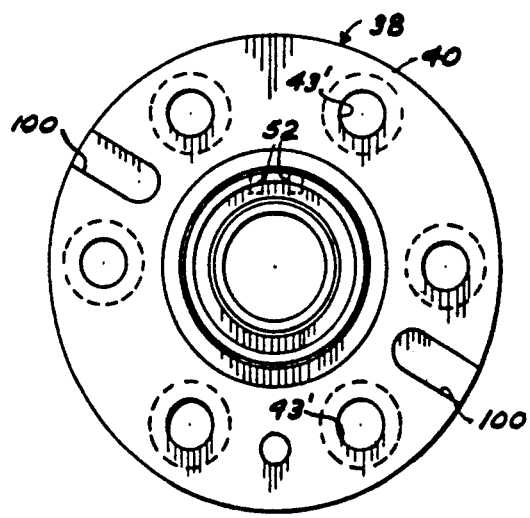
FIG. 10

UNITIZED DISC FLOW CONTROL ASSEMBLY FOR A RESTRICTOR VALVE

CROSS REFERENCE TO RELATED APPLICATION

This application is a continuation-in-part of applications filed by me in the United States Patent and Trademark Office on Jan. 30, 1989, under Ser. No. 07/303,434, now U.S. Pat. No. 4,922,950, for Unitized Disc Flow Control Assembly for a Restrictor Valve and Feb. 5, 1990, under Ser. No. 07/474,979 for Unitized Disc Flow Control Assembly for a Restrictor Valve, now U.S. Pat. No. 4,967,787.

BACKGROUND OF THE INVENTION

1. Field of the Invention

The present invention relates to fluid flow control valves of the right angular type and more particularly to a unitized assembly of valve flow control discs and components.

Flow restrictor valves, utilizing a pair of discs having mating and mismating multiple orifices for restricting the flow rate through the valve, are highly satisfactory and in general use. The relatively high velocity of abrasive fluid passing through the disc orifices wears or cuts the disc material and inside wall surface of fittings or pipe adjacent the downstream side of the discs necessitating their replacement. When the discs must be replaced, as a result of being worn by fluid contained abrasive, it has been necessary to stop the fluid flow through the valve both upstream and downstream in order to remove the valve body from its connection with the flow line in order to disassemble the valve components and replace worn discs. This has been a time consuming process as well as an economic loss due to the interruption of fluid flow.

This invention eliminates the necessity of removing the valve body from the line to replace the control flow discs by unitizing the discs and their supporting components which may be manually removed from and inserted into the valve body as a unit.

2. Description of the Prior Art

I do not know of any patents disclosing the feature of providing a replaceable unitized disc control flow assembly for a flow restricting disc type valve assembly.

SUMMARY OF THE INVENTION

A flow restrictor valve, having an elongated centrally bored and counterbored body for forming a fluid outlet port at one end and receiving flow control discs in the counterbore, is provided with a lateral or right angular inlet port forming a fluid passageway across the position of the mated or mismated flow control discs. The discs are axially disposed in one end of a first sleeve-like cage having a wall port in register with the lateral port. A centrally bored flanged top valve bonnet is secured to the valve body in the outward end portion of its counterbore. A second sleeve abuts and is secured to the downstream end of the sleeve-like cage. The downstream end of the second sleeve has a plurality of fluid flow velocity reducing ports in its end wall. A downstream sleeve-like spider insert contained by the second sleeve forms a fluid pressure drop between its upstream and downstream ends. The bonnet axially supports a yoke pinned to one rotatable flow control disc. The inward end portion of the bonnet is inserted into and joined to the adjacent end portion of the sleeve-like cage by a helical wire retainer within cooperating semicircular grooves in the overlapped portion of the bonnet and sleeve wall. Index pins in the bonnet and valve body reference the components with each other to insure a selected open or closed fluid passageway. An indexed position control handle and valve top, is secured to the end portion of the yoke stem projecting through the bonnet.

The principal object of this invention is to provide a unitized assembly of valve components controlling the mated and mismated position of flow restrictor discs in a right angular valve body creating a fluid pressure drop adjacent the downstream side of the discs and which may be inserted into and removed from the valve body as a unit without disconnecting the valve body from a fluid conducting line.

BRIEF DESCRIPTION OF THE DRAWINGS

FIG. 2 is an elevational view of the bonnet and a vertical cross section of the valve fluid control units, with the discs removed, rotated 180° about their vertical axes from the position in FIG. 1;

FIG. 3 is a horizontal cross sectional view taken substantially along the line 3—3 of FIG. 2, illustrating the manner of inserting or removing the connecting wire retainer;

FIG. 4 is an elevational view of the right side of the first sleeve, per se, as viewed in FIG. 1;

FIG. 5 is a top view of the first sleeve, per se, rotated 90° clockwise from its position in FIG. 4;

FIG. 8 is a top view of one rotatable disc, per se;

FIG. 9 is a vertical cross sectional view taken substantially along the line 9—9 of FIG. 8; and, FIG. 10 is a bottom view of the valve bonnet, per se, as shown in FIG. 2;

DESCRIPTION OF THE PREFERRED EMBODIMENTS

Figure 1:
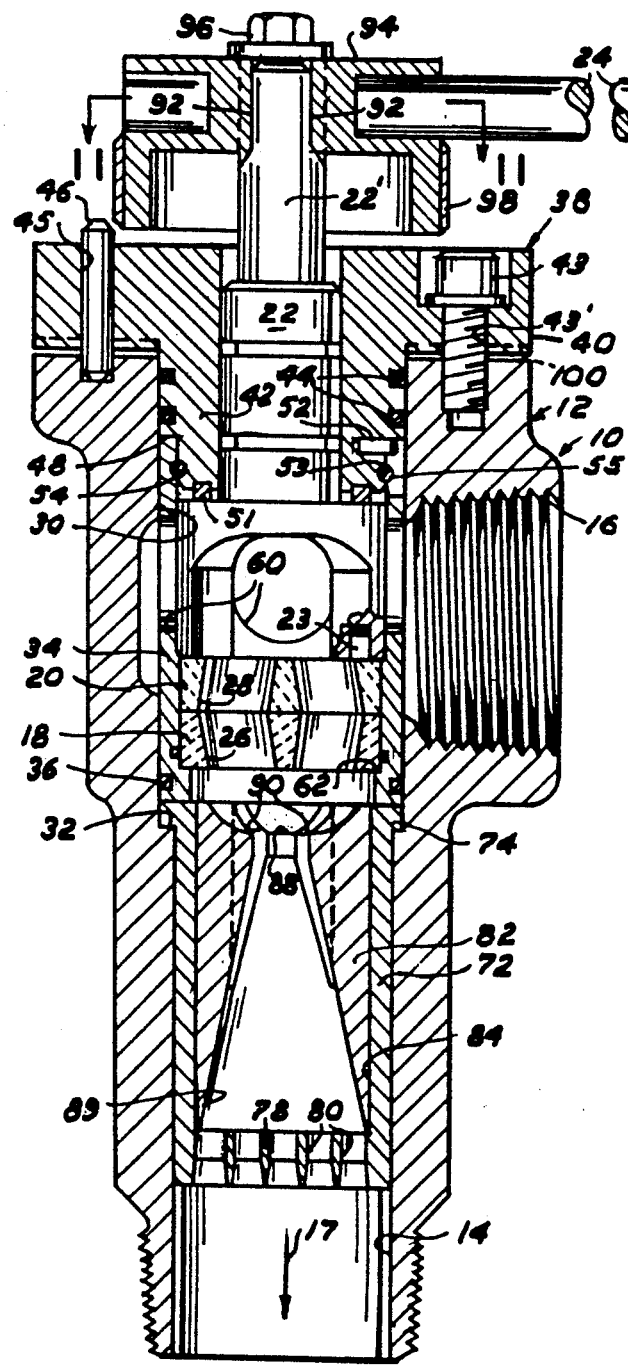
FIG. 1 is a vertical cross sectional view of the valve.
Figure 11:
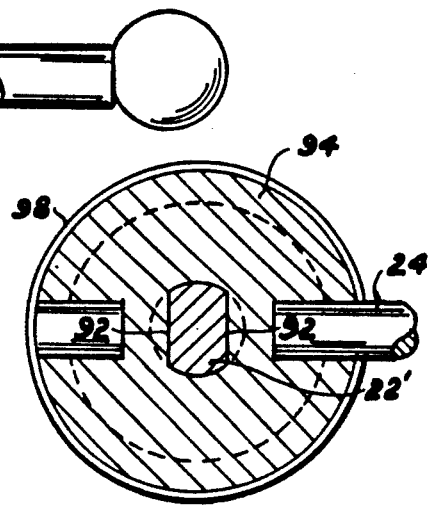
FIG. 11 is a vertical cross sectional view taken substantially along the line 11—11 of FIG. 1.

Like characters of reference designate like parts in those figures of the drawings in which they occur.

In the drawings:

The reference numeral 10 indicates a flow restrictor valve having a valve body 12 commonly referred to as "right angle valve" characterized by a first inline flow port 14 and its second flow port 16 disposed intermediate the length of the body 12 with its axis normal to the first port 14 and forming a fluid passageway with flow assumed to be in the direction of the arrow 17. This restrictor valve is characterized by mating and mismating discs 18 and 20 disposed in contiguous face to face contact axially of the flow port 14. A yoke 22, axially secured by pins 23, only one being shown (FIG. 1), to the disc 20, includes a stem portion 22' which projects axially outwardly of the valve body for connection with a control handle 24 for angularly rotating the disc 20 relative to the disc 18 for mating or mismating the disc ports 26 and 28 (FIGS. 1 and 8) in a conventional manner. The above description is substantially conventional with right angular flow restrictor valves and is set forth to show the combination of valve components which are unitized in this invention as will now be explained.

The valve body top or head end, as viewed in FIG. 1, is counterbored opposite the port 14, as at 30, forming an annular shoulder 32 facing upstream and spaced downstream beyond the downstream limit of the lateral port 16. The counterbore 30 axially receives a first sleeve 34 having one end portion sealed with the counterbore wall upstream from the shoulder 32 by an O-ring 36. The other end of the sleeve 34 terminates in the body counterbore above the lateral port 16 intersection with the counterbore 30 and in spaced relation with respect to the head end of the valve body.

A centrally bored valve bonnet 38 having a bolt circle hole equipped annular flange 40 overlies the valve head end, in close spaced relation for the reason presently apparent, with its step diameter reduced stem 42 entering the counterbore 30 and sleeve 34. O-rings 44 seal the bonnet stem with the wall forming the counterbore. Bolts 43, only one being shown (FIG. 1), in the bolt holes 43' join the bonnet to the body. The bonnet flange 40 and body top end surface are line drilled, as at 45, for receiving an indexing pin 46.

Adjacent its shoulder 48 defining its innermost diametrically reduced end portion 50 the bonnet is provided with a pair of radial circumferentially spaced outstanding sleeve cage index pins 52 for the purpose presently explained.

Below the horizontal plane of the index pins 52 the reduced end portion 50 of the bonnet is provided with a circumferential, semicircular in toric cross section, groove 53 and the inner periphery of the top end portion of the sleeve 34 is similarly provided with a cooperating semicircular groove 54 forming an annular void, circular in transverse toric cross section, between the bonnet and sleeve for nesting a length of helically coiled malleable wire 55 inserted into the void in the manner presently explained.

The mating tolerance between the bonnet end portion 50 and adjacent end of the sleeve 34 and wire 55 contained therebetween is such that the bonnet may be manually inserted into and indexed with the sleeve 34 during the subassembly thereof. As shown by FIG. 4, the upper end portion of the sleeve wall is provided with a vertical wall slot 56 at a selected location open through its top edge for slidably receiving the sleeve indexing pins 52 projecting outwardly from the bonnet.

The sleeve 34 is provided with lateral bores 60 with one bore 60 in vertical alignment with and spaced downwardly from the recess 56 operatively aligned with the port 16 and is maintained in this position by the indexing pins 52 and 46.

Figure 6:
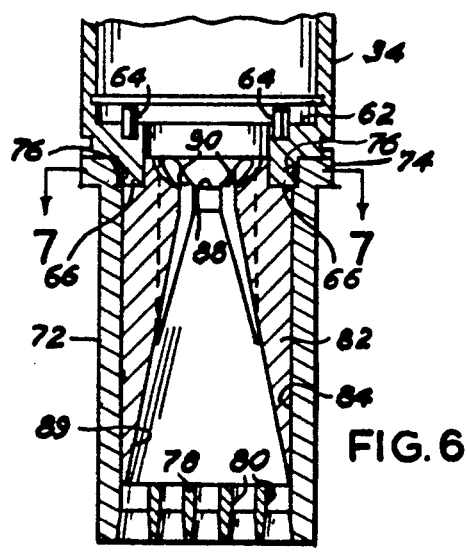
FIG. 6 is a fragmentary vertical cross section view taken substantially along the line 6—6 of FIG. 2.

The downstream end of the inner wall surface of the sleeve 34 is provided with an annular upstream facing shoulder 62 supporting the disc 18 and secured thereto by a pair of dowel-like pins 64 (FIG. 6). The disc 18 is sealed with the inner wall surface of the sleeve 34 by an O-ring in a conventional manner.

Figure 7:
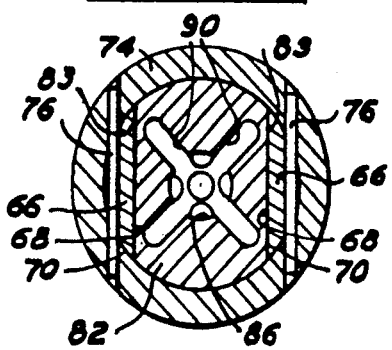
FIG. 7 is a horizontal cross sectional view looking in the direction of the arrows 7—7 of FIG. 6.

A pair of integral laterally spaced horizontal lugs 66 depend from the sleeve 34. The lugs 66 each substantially describe a subtended arc of a circle, as viewed in FIG. 7, characterized by parallel inward surfaces 68 and outer arcuate surfaces 70.

A second or basket sleeve 72 abuts and depends from the bottom end of the first sleeve 34. The second sleeve 72 is characterized by an outstanding annular flange 74 at its upper end portion having an outside diameter substantially equal with the outside diameter of the first sleeve 34.

The bore 84 of the second sleeve 72 cooperatively receives the arcuate surfaces 70 of the first sleeve lugs 66. The outstanding flange 74 of the second sleeve and a peripheral portion of each of the lugs 66 are line drilled for receiving a pair of pins 76 locking the second sleeve 72 to the first sleeve 34 as more clearly shown by FIG. 7.

The depending end of the second sleeve 72 is provided with an end wall 78 having a plurality of closely spaced axial apertures 80 extending therethrough. Medially their vertical length as viewed in FIGS. 2 and 6 the sleeve apertures 88 are outwardly flared toward their depending end for the purpose presently explained.

The flange 74 normally rests on the annular upward facing flange 32 of the valve body.

A sleeve-like flow velocity reducing spider 82 is coaxially received by the inner wall surface 84 of the second sleeve 72. The spider extends between the depending end of the first sleeve 34 and the upstream surface of the second sleeve end wall 78. The spider is characterized by a central bore 86 at the downstream end of an arcuate recess 88 formed in the upper end surface of the spider 82. The inner wall surface of the spider diverges downwardly from the downstream limit of its bore 86 for the purposes presently explained.

The upper end portion of the spider is further provided with four diagonally disposed slots 90 intersecting the wall of the bore 86 and arranged by pairs in opposed aligned relation. The purpose of the slots is to provide an increase of fluid flow above that provided by the spider bore 86 and to break up turbulence of fluid emitted from the mated or partially mated apertures in the discs 18 and 20.

The periphery of the upper end portion of the spider is oppositely rabbited to define a pair parallel outwardly facing shoulders 83 for contiguously contacting the respective first sleeve lug surfaces 68.

The depending end surface of the bonnet reduced end portion 50 is provided with a concentric annular groove which cooperatively receives an annular bearing 51 depending from the bonnet end surface for bearing against the yoke and impinging the depending end surface of the yoke 22 against the superposed discs 20 and 18 in turn seated on the shoulder 62 when the bolts 43 are tightened.

The above described components bonnet, yoke, first sleeve 34 containing discs 18 and 20 and the second sleeve 72 containing the spider insert 82 form a unit 91 removable from the valve body 12 by simply removing the bonnet bolts 43.

The outwardly projecting stem end 22' of the yoke 22 is provided with opposing wrench flats 92 cooperatively nested by a broached central opening in a valve top 94. The valve top is secured to the stem 22' by a nut 96. The handle 24 projects laterally from the valve top 94.

An index guide 98, surroundingly secured to the valve top cooperates with indicia or the indexing pin 46, projecting above the flange 40, for visually indicating the mated or mismated position of the disc 20 relative to the disc 18.

The sleeve 34 is assembled with the valve bonnet 38 with the yoke 22 previously placed in the latter by manually positioning the bonnet end portion 50 in the sleeve with the indexing pins 52 disposed within the sleeve recess 56. As illustrated by FIG. 3, one end of the wire 55 is manually inserted through the recess 56 in a tangential direction relative to the inner periphery of the sleeve and adjacent portion of the bonnet 38. As the wire 55 is manually inserted it easily assumes a circular configuration by sliding along the confines of the mating grooves 53 and 54 until its inserted end is visible in the recess 56. The wire 55 is then cut-off adjacent one side of the recess so that both its ends are nested by the grooves.

OPERATION

In operation, assuming the removable unit 91 has been installed in the valve body in an operative position, as illustrated by FIG. 1. Fluid flow through the passageway 17 is regulated in a conventional manner by the handle. A substantial fluid pressure drop across the position of the spider 82 is created by the fluid expanding against its downstream diverging wall surfaces 89. When it is evident that one or both of the discs 18 or 20 must be replaced as a result of abrasive fluid wearing the discs and or the spider 82 the fluid flow through the passageway 17 is discontinued and the pressure is bled off. The valve bonnet bolts 43 are removed after removing the nut 96 and valve top 94. The bottom surface of the flange 40 is provided with a pair of diametrically opposite radial recesses 100 (FIG. 10) for inserting a tool such as a screwdriver, not shown, under the flange 40 in a fulcrum action against the body top in order to separate the bonnet from the valve body 12. The unitized assembly 91 is then axially removed from the body counterbore 30. Thereafter a replacement or new unitized valve assembly, as described hereinabove, may be axially inserted into the valve counterbore with the index pin 46 serving as a reference for desired orientation of the first sleeve relative to the flow passageway 17. Similarly the yoke stem wrench flats 92, in combination with the indexing guide 98 positions the yoke 22 and disc 20 in desired registration with the stationary disc 18.

Alternatively, the discs 18 and 20 may be replaced in the original unitized assembly 91 after removal from the valve body by removing the wire 55 from the cooperating groove connecting the first sleeve to the bonnet by grasping one visible end of the wire and removing it from the cooperating grooves 53 and 54 in a sliding action relative to the bonnet and sleeve 34 thus permitting removal of the yoke 22 and discs 18 and 20 from the sleeve 34. New discs are then installed and the repaired unit installed as described hereinabove.

Obviously the invention is susceptible to changes or alterations without defeating its practicability. Therefore, I do not wish to be confined to the preferred embodiment shown in the drawings and described herein.

I claim:

1. In a flow restrictor valve assembly having its body counterbored opposite one valve port defining an annular outwardly facing shoulder for receiving superposed multiple orifice discs adjacent the shoulder in face to face axial alignment with said one port, said body having a lateral port communicating with the counterbore, the improvement comprising:
    cage means including a first sleeve within and normally sealing with the counterbore adjacent said annular shoulder and surrounding said discs,
    said first sleeve having a wall port axially communicating with the lateral port and having a recess in its end surface opposite the discs;
    a valve bonnet secured at one end portion to said first sleeve and closing the counterbore end portion opposite said shoulder;
    yoke means axially connected with the disc opposite said one port and having a yoke stem projecting beyond said valve body at the outer end of the counterbore for angular rotation of one disc relative to the other disc;
    valve top means secured to and surrounding said yoke stem for angularly rotating said yoke;
    second sleeve means adjacent the downstream limit of said first sleeve for creating a pressure drop across its position; and,
    indexing means for referencing the position of the first sleeve the bonnet, the bonnet to the valve body and the valve top to the yoke and bonnet.

2. The combination according to claim 1 and further including:
    a sleeve-like spider having a downstream diverging inner wall surface contained by said second sleeve means.

3. The combination according to claim 2 in which:
    said second sleeve means is characterized by a foraminated downstream end wall.

4. The combination according to claim 2 in which the outer surface of the end portion of said bonnet secured to said sleeve and the surrounding inner surface of the sleeve are provided with cooperating annular grooves and further including:
    an elongated strand nested by the cooperating grooves.

5. The combination according to claim 2 and further including:
    friction reducing means interposed between said yoke means and said valve top means for impinging said discs against said shoulder.

6. In a multiple orifice disc flow restricting valve having its body counterbored opposite one valve inlet port defining an annular upstream facing shoulder, said body having a lateral port communicating with the counterbore to complete a flow passageway, the improvement comprising:
    orifice fluid flow control discs and a downstream downwardly diverging inner wall surface for creating a fluid pressure drop and axially inserted as a unit into and closing said counterbore and sealing with the counterbore wall for controlling the volume and velocity of fluid through the passageway;
    strand means separable joining said sleeve means to the valve bonnet; and
    index pins in said valve bonnet for angularly positioning said bonnet and said sleeve relative to said valve body in a predetermined position.

* * * * *